United States Patent
Hauleitner et al.

(10) Patent No.: US 10,753,396 B2
(45) Date of Patent: Aug. 25, 2020

(54) HYBRID ROLLING BEARING, PARTICULARLY FOR REFRIGERANT COMPRESSOR

(71) Applicant: Aktiebolaget SKF, Gothenburg (SE)

(72) Inventors: Rudolf Hauleitner, Steyr (AT);
Guillermo Enrique Morales Espejel, Ijsselstein (NL); Antonio Gabelli, Ijsselstein (NL); Aidan Kerrigan, Utrecht (NL); Charlotte Vieillard, Woerden (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/121,941

(22) Filed: Sep. 5, 2018

(65) Prior Publication Data

US 2019/0186541 A1    Jun. 20, 2019

(30) Foreign Application Priority Data

Dec. 20, 2017  (DE) .................. 10 2017 223 422
Apr. 27, 2018  (DE) .................. 10 2018 206 635

(51) Int. Cl.
*F16C 33/30*    (2006.01)
*F16C 33/34*    (2006.01)
(Continued)

(52) U.S. Cl.
CPC .......... *F16C 33/303* (2013.01); *F04D 29/059* (2013.01); *F16C 33/34* (2013.01);
(Continued)

(58) Field of Classification Search
CPC .............. F16C 2240/54; F16C 2240/64; F16C 33/303; F16C 33/585; F16C 2206/60;
(Continued)

(56) References Cited

U.S. PATENT DOCUMENTS 6,568,858 B2 * 5/2003 Tanimoto ................ C22C 38/18
                                                         384/492
6,828,041 B2 * 12/2004 Ueda ........................ C23C 8/02
                                                         428/660
(Continued)

OTHER PUBLICATIONS

Hybrid Bearings Micropitting, 8pg.
(Continued)

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

A Hybrid rolling bearing includes an inner raceway and an outer raceway and a plurality of rolling elements arranged therebetween. The outer raceway and the inner raceway are made from bearing steel, having a first surface RMS roughness $R_{q1}$. The rolling elements are made from a ceramic material and have second surface RMS roughnesses $R_{q2,i}$. At least one of the rolling elements has an increased surface RMS roughness $R_{q2,N}$, which is significantly higher than the RMS roughnesses $R_{q2,i}$ of the remaining rolling elements. The hybrid rolling bearing can be installed within a refrigerant compressor.

16 Claims, 2 Drawing Sheets

(51) Int. Cl.
*F16C 33/66* (2006.01)
*F04D 29/059* (2006.01)
*F16C 33/44* (2006.01)
*F16C 33/62* (2006.01)
*F04D 29/049* (2006.01)
*F16C 33/32* (2006.01)
*F16C 33/56* (2006.01)
*F16C 19/54* (2006.01)

(52) U.S. Cl.
CPC .......... *F16C 33/664* (2013.01); *F04D 29/049* (2013.01); *F05B 2240/50* (2013.01); *F05D 2300/516* (2013.01); *F16C 19/543* (2013.01); *F16C 33/32* (2013.01); *F16C 33/44* (2013.01); *F16C 33/56* (2013.01); *F16C 33/62* (2013.01); *F16C 33/6692* (2013.01); *F16C 2204/66* (2013.01); *F16C 2206/06* (2013.01); *F16C 2206/60* (2013.01); *F16C 2208/04* (2013.01); *F16C 2208/36* (2013.01); *F16C 2240/54* (2013.01); *F16C 2240/64* (2013.01); *F16C 2360/44* (2013.01); *F16C 2362/52* (2013.01)

(58) Field of Classification Search
CPC .. F16C 2204/60; F16C 2360/00; F16C 33/34; F16C 33/664; F16C 33/44; F16C 33/62; F16C 33/32; F16C 33/56; F16C 33/6692; F16C 2206/06; F16C 2362/52; F16C 19/543; F16C 2208/04; F16C 2208/36; F16C 2204/66; F16C 2360/44; F05B 2240/50; F04D 29/059; F04D 29/049; F05D 2300/516
See application file for complete search history.

(56) References Cited

U.S. PATENT DOCUMENTS

| | | | |
|---|---|---|---|
| 8,967,875 B2* | 3/2015 | Rychahivskyy | F16C 33/32 384/492 |
| 9,670,959 B2 | 6/2017 | Morales Espejel | |
| 2002/0191878 A1* | 12/2002 | Ueda | C23C 8/02 384/492 |
| 2007/0269158 A1 | 11/2007 | Tsujijimoto | |
| 2011/0152138 A1* | 6/2011 | Nakai | C04B 35/119 508/103 |
| 2012/0286608 A1 | 11/2012 | Komiyama | |

OTHER PUBLICATIONS

Whitehouse handbook of surface and nanometrology, 14pg.
Vieillard Surface rolling contact fatigue damage progression in hybrid bearings, 13pg.
ISO standard texture, 45pg.

\* cited by examiner

HYBRID ROLLING BEARING, PARTICULARLY FOR REFRIGERANT COMPRESSOR

CROSS-REFERENCE

This application claims priority to German patent application no. 102017223422.9 filed on Dec. 20, 2017 and to German patent application no. 102018206635.3 filed on Apr. 27, 2018, the contents of which are fully incorporated herein by reference.

TECHNOLOGICAL FIELD

The present invention relates to a hybrid rolling bearing comprising an inner raceway, and outer raceway, and a plurality of rolling elements arranged therebetween. The present invention also relates to a refrigerant compressor comprising such a hybrid rolling bearing.

BACKGROUND OF THE PRESENT INVENTION

Hybrid rolling bearings are often used in very demanding environments, for example in applications with reduced lubrication conditions and/or in high speed and/or high temperature applications. With the increased severity of the working conditions, e.g. heavier loads in combination with higher temperatures, thinner lubrication films and/or poor lubrication conditions the bearing components can suffer from surface initiated fatigue, so called micropitting. Even if micropitting is not necessarily a primary failure mode, it can facilitate/accelerate the appearance of other failures like indentation, surface initiated spalling and seizure.

BRIEF SUMMARY OF THE PRESENT INVENTION

Thus, micropitting is one of the mechanisms responsible for life-limiting bearing wear. One approach to mitigate the effects of micropitting is to ensure that the rolling contact surfaces in a bearing are always separated by a lubrication film of sufficient thickness.

This is not possible in ultra-thin lubrication film thickness (UTFT) applications. UTFT applications in rolling bearings refer to conditions when the separation of surfaces by a lubricating film is compromised by at least one of:
 (a) low viscosity of the lubricant i.e. fluids with a dynamic viscosity lower than 1 cSt, and
 (b) lubricant starvation i.e. a condition where the available lubricant layer in the rolling contact inlet cannot guarantee fully flooded conditions in the bearing.

In both conditions the overall lubricant layer thickness at the contact surfaces is limited to 300 nm or less. This can happen because the bearing is lubricated with grease (limited lubricant release) or the lubricant evaporates before reaching the contact (volatile fluids) or there is limited lubricant supply by the lubrication system.

Additionally, many of these UTFT applications use media lubrication, like pure refrigerant lubrication, oil-refrigerant mixture lubrication, fuels (kerosene, diesel, gasoline, natural gas, alcohols) lubrication, and/or grease combined with media lubrication. Water lubrication is excluded. For pure refrigerant lubrications, the resulting lubricant film thickness is even significantly less than 300 nm, typically in the range of 30 nm.

The main failure mode of these rolling bearings is wear assisted by corrosion. Wear due to solid-to-solid contact enhanced by corrosion can modify the raceway profile, increase the clearance and concentrates local stresses that could develop spalls. Another important failure mode of these bearings is solid contamination. Since these applications work with very thin film thicknesses (e.g. less than 300 to 200 nm) any solid particle (debris, sand, oil soot, etc.) even the very small ones can produce damage in the contact surfaces and can modify the topography disrupting the film build-up capability of the original surface. Excessive contamination can also generate high friction forces that will hinder/block the rotation of the bearing and can produce fractures in the cage or seizure in the raceways and rolling elements.

Therefore, it has been proposed in the state of the art to employ surface engineering techniques and to provide a roughness for the raceways of the bearing rings and a roughness of the rolling elements which are as equal as possible, in order to reduce micropitting and improve the wear and fatigue life of bearings. This is based on the understanding that a rougher rolling contact surface imposes load micro cycles on a smoother, opposing rolling contact surface, in the presence of sliding and in the absence of full-film lubrication. Disadvantageously, in practice, even in ordinary steel-steel bearings, the raceways of a bearing are generally somewhat rougher than the rolling elements. In hybrid rolling bearings the difference between the roughnesses is even greater.

It is therefore object of the present invention to provide a hybrid rolling bearing which may be used in ultra-thin lubrication film thickness applications, particularly in a refrigerant compressor device, and which has an improved corrosion and micropitting resistance.

This object is solved by a hybrid rolling bearing according to patent claim 1 and a refrigerant compressor comprising such a bearing.

In the following a hybrid rolling bearing comprising an inner raceway and an outer raceway and a plurality of rolling elements arranged therebetween is proposed. The hybrid rolling bearing may be a hybrid ball bearing or a hybrid roller bearing having balls or rollers, respectively, as rolling elements. Further, the hybrid rolling bearing has an outer raceway and an inner raceway made from bearing steel having a first surface RMS roughness $R_{q1}$, and has rolling elements (balls or rollers) made from a ceramic material having second surface RMS roughnesses $R_{q2,i}$.

For providing a hybrid rolling bearing which has a prolonged service life and an improved corrosion and micropitting resistance even after running-in, at least one of the rolling elements of the hybrid rolling bearing has an increased surface RMS roughness $R_{q2,N}$, which is significantly higher than the RMS roughnesses $R_{q2,i}$ of the remaining rolling elements. The higher $R_{q2,i}$ roughness value of the at least one rolling element allows for an increased wear when the at least one rolling element with the increase roughness contacts the raceways. Even if increased wear should in generally be avoided, the intended wear according to the invention smoothes out indentations in the raceways which occur during the service life of the bearing. This in turn reduces the overall corrosion of the hybrid bearing and prolongs the service life of the bearing.

A further advantage of the at least one rolling element with the increased roughness is that contamination particles may be received within the rough surface of the at least one rolling element. Thereby, contamination particles, which are known to damage the raceways of the rings and/or rolling elements, may be filtered out, which also increases the wear and corrosion resistance of the bearing.

Thereby it has been proven as advantageous, if the increased RMS roughness $R_{q2,N}$ of the at least one rolling element is 10 to 25 times higher than the RMS roughnesses $R_{q2,i}$ of the remaining rolling elements. Such a high roughness allows for excellent smoothing results.

According to a further preferred embodiment, the increased roughness $R_{q2,N}$ of the at least one rolling element is higher than the roughness $R_{q1}$ of the raceways. It is further preferred that the roughness of the remaining rolling elements is lower than the roughness of the raceways, wherein the roughness of the raceways $R_{q1}$ for hybrid ball bearings is 2 to 5, preferably 2.5 to 4, times higher than the roughness $R_{q2}$ of the remaining balls, and/or the roughness of the raceways $R_{q1}$ for hybrid roller bearings is 1.2 to 4, preferably 1.5 to 3, times higher than the roughness $R_{q2}$ of the remaining rollers.

For a hybrid ball bearing according to a further preferred embodiment it is further preferred if the increased RMS roughness $R_{q2,N}$ of the at least one ball is 2 to 12 times higher than the RMS roughness of the raceways $R_{q1}$.

Additionally or alternatively, the hybrid ball bearing shows one or more of the following roughness relations:

the combined surface RMS roughness $R_q$ of raceways and the remaining balls is $R_q \leq 4 \times 10^{-9}(1000d_m)^{0.55}$ [meter], and the combined surface RMS roughness $R_q$ of raceways and the at least one ball with the increased roughness is $R_q \leq f^* 4 \times 10^{-9}(1000d_m)^{0.55}$ [meter], with $2 \leq f \leq 12$, wherein $R_q$ is defined as $R_q = \sqrt{R_{q1}^2 + R_{q2}^2}$;

the combined roughness skewness $R_{sk}$ of raceways and all balls is $R_{sk} \leq 0$, wherein $R_{sk}$ is defined as $$R_{sk} = \frac{R_{sk1} R_{q1}^3 + R_{sk2} R_{q2}^3}{R_q^3};$$

the combined roughness slope parameter $R_{\Delta qx}$ of raceways and remaining balls is $R_{\Delta qx} \leq 8$ [mrad], and the combined roughness slope parameter $R_{\Delta qx}$ of raceways and the at least one ball with increased roughness is $R_{\Delta qx} \leq f^* 8$ [mrad], with $2 \leq f \leq 12$, wherein $R_{\Delta qx}$ is defined as $$R_{\Delta qx} = \frac{R_{\Delta qx1} + R_{\Delta qx2}}{2}.$$

For a hybrid roller bearing according to a further preferred embodiment it is further preferred if the increased RMS roughness $R_{q2,N}$ of the at least one roller is 1.2 to 10 times higher than the RMS roughness of the raceways $R_{q1}$.

Additionally or alternatively, the hybrid roller bearing shows one or more of the following roughness relations:

the combined surface RMS roughness $R_q$ of raceways and the remaining rollers is $R_q \leq 5 \times 10^{-8}(1000d_m)^{0.2}$ [meter], and the combined surface RMS roughness $R_q$ of raceways and the at least one roller with the increased roughness is $R_q \leq f^* 5 \times 10^{-8}(1000d_m)^{0.2}$ [meter], with $1.2 \leq f \leq 18$, wherein $R_q$ is defined as $R_q = \sqrt{R_{q1}^2 + R_{q2}^2}$;

the combined roughness skewness $R_{sk}$ of raceways and all rollers is $R_{sk} \leq 0$, wherein $R_{sk}$ is defined as $$R_{sk} = \frac{R_{sk1} R_{q1}^3 + R_{sk2} R_{q2}^3}{R_q^3};$$

the combined roughness slope parameter $R_{\Delta qx}$ of raceways and remaining rollers is $R_{\Delta qx} \leq 50$ [mrad], and the combined roughness slope parameter $R_{\Delta qx}$ of raceways and the at least one roller with increased roughness is $R_{\Delta qx} \leq f^* 50$ [mrad], with $1.2 \leq f \leq 18$, wherein $R_{\Delta qx}$ is defined as $$R_{\Delta qx} = \frac{R_{\Delta qx1} + R_{\Delta qx2}}{2}.$$

In contrast to the latest efforts to provide hybrid rolling bearings having substantially the same roughness values for raceways and rolling elements, the inventors have surprisingly found that micropitting and corrosion induced wear of a hybrid rolling bearing may be significantly reduced if the roughnesses of the contacting surfaces of the hybrid rolling bearing, particularly in mint conditions, is engineered to be within the above mentioned predefined boundaries.

By providing a hybrid rolling bearing being engineered to have the above defined parameters, the ceramic rolling elements reduce boundary frictions and optimize running-in. Further in poor lubrication and contamination conditions, the proposed ceramic rolling elements delay the damage progression. In addition, the tight control of the composed roughness helps in the build-up of lubrication films and the improvement of running-in.

According to a further preferred embodiment the hybrid rolling bearing has an osculation $\Phi$, which ranges between 1.02 and 1.1, wherein $\Phi$ is defined as $\Phi = 2r_{i,e}/D_w$, with $r_{i,e}$ being the raceway radius of the inner raceway or the outer raceway, and $D_w$ being the diameter of the rolling element. The proposed osculation gives a balance between low friction forces at the surface and high contact stresses, so bearing life is optimized.

It is further advantageous, if at least one raceway of the proposed hybrid rolling bearing is made from a hardened corrosion-resistant steel, having a corrosion resistance with a pitting potential of at least 25 mV higher than the stainless steel reference (AISI 440C) according to ASTM G61-86. Additionally or alternatively, the used steel has an after-heat-treatment hardness of ≥58 HRC and/or a fracture toughness of at least 14 MPa m½ (see ASTM-E399-12).

Further, it is preferred that at least one rolling element of the hybrid rolling bearing is made from silicon nitride (Si3N4). This, in combination with the selected corrosion-resistant properties of the steel, allow for low wear development in the hybrid rolling bearing, since in this case wear is dependent on the steel hardness and the chemically aggressiveness of the environment (corrosion assisted wear).

According to a further preferred embodiment, the rolling elements of the proposed hybrid rolling bearing are guided by means of a cage, which is preferably made from a fiber-enforced material, preferably from a glass-fiber enforced PEEK or a carbon fiber material. The fiber-enforced material of the cage prevents cage fracture in heavy contamination environment.

All these features alone or in combination ensure a long duration of the hybrid rolling bearing even in the specified conditions of ultra-thin lubrication film thickness conditions. This could not be achieved without the above described features.

Hence, according to a further preferred embodiment, the proposed hybrid rolling bearing is lubricated by means of an ultra-thin lubrication film arranged between the rolling elements and the raceways, wherein the lubrication film thickness is less than 300 nm. Thereby, it is even more advantageous, if the hybrid rolling bearing is lubricated with pure refrigerant or a refrigerant/oil mixture forming an elasto-hydrodynamic lubricant film between the rolling elements and the raceways.

Thus, a further aspect of the invention relates to a refrigerant compressor comprising at least one hybrid rolling bearing as described above.

Further advantages and preferred embodiments are disclosed in the claims, the description and the figures. It should be further noted that a person skilled in the art may combine the presented features otherwise than indicated without extending the scope of the invention.

In the following, the present invention will be described by means of embodiments shown in the figures. The shown embodiments are exemplarily, only, and are not intended to limit the scope of protection. The scope of protection is solely defined by the attached claims.

DETAILED DESCRIPTION OF THE PRESENT INVENTION

Figure 1:
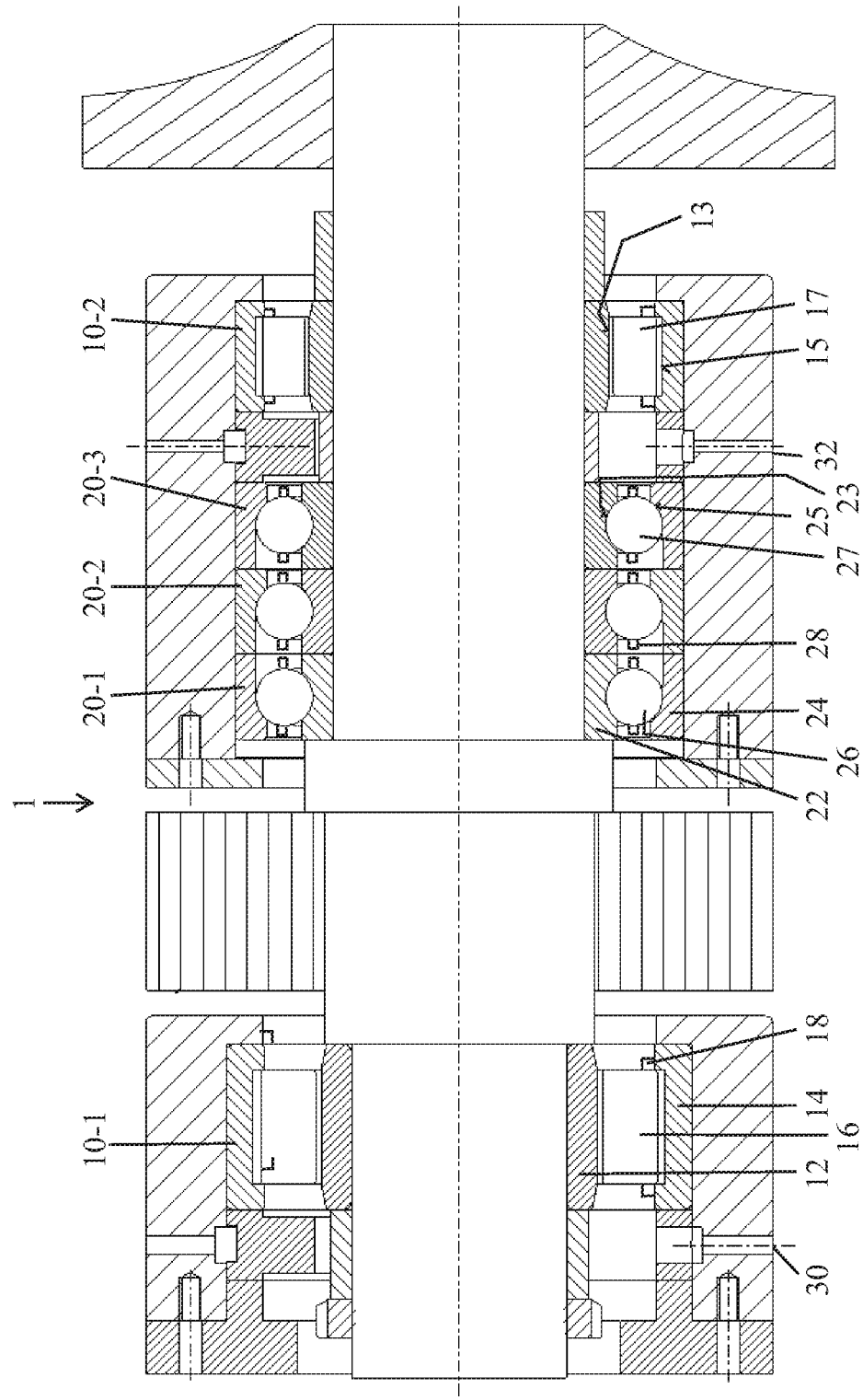
FIG. 1: presents a schematic drawing of a refrigerant compressor comprising a hybrid roller bearing according to a preferred embodiment.

In the following same or similar functioning elements are indicated with the same reference numerals.

FIG. 1 shows a sectional view of a refrigerant compressor 1 having an electric motor 2 which drives a shaft 4. The shaft 4 is radially supported by a set of hybrid roller bearings 10-1, 10-2, which are arranged on both sides of the motor 2. Further, the shaft 4 is axially and radially supported by a plurality of hybrid ball bearings 20-1, 20-2, 20-3. The hybrid ball bearings 20 are preferably angular contact ball bearings, which are enabled to support axial and/or radial forces, but may be any other type of ball bearing. The hybrid roller bearings 10 may be any kind of roller bearing, e.g. a cylindrical roller bearing, a spherical roller bearing, a tapered roller bearing or a toroidal roller bearing or combinations thereof.

Each hybrid roller rolling bearing 10 comprises an inner ring 12 having a raceway 13, an outer ring 14 having a raceway 15, and rollers 16 having raceways 17, which are arranged therebetween. The rollers 16 are further guided by means of a cage 18, which is preferably made from a glass-fiber enforced PEEK material. However, any other fiber-enforced material e.g. a carbon fiber material may be used for the cage.

Analogously, each hybrid ball bearing 20 comprises an inner ring 22 having a raceway 23, an outer ring 24 having a raceway 25, and balls 26 having surfaces 27, arranged therebetween. Also, the balls 26 are guided by means of a cage 28, which is preferably made from a glass-fiber enforced PEEK material. However, any other fiber-enforced material e.g. a carbon fiber material may be used for the cage.

Further, it should be noted that the hybrid ball bearings shown in FIG. 1, have a contact angle of 25° to 30°, but it is also possible to use hybrid ball bearings having contact angles in the range of 0° to 45°. Optionally, the hybrid ball bearing and/or the hybrid roller bearing 20 has an osculation $\Phi$, which ranges between 1.02 and 1.1, wherein $\Phi$ is defined as $\Phi = 2r_{i,e}/D_w$, $r_{i,e}$ being the raceway radius of the inner raceway or the outer raceway, and $D_W$ being the diameter of the ball/roller. The proposed osculation gives a balance between low friction forces at the surface and high contact stresses, so bearing life is optimized.

As is further shown in FIG. 1, the hybrid rolling bearings 10, 20 are lubricated by lubrication means 30, 32, which are adapted to provide a lubricant to the hybrid rolling bearings 10, 20. Since the device shown in FIG. 1 is a refrigerant compressor, it is preferred to use the refrigerant itself or a refrigerant/oil mixture as lubricant. This has proven to improve heat transfer in the condensers and the evaporator heat exchangers. Eliminating oil lubricant also eliminates the need for oil maintenance and oil cost.

On the other hand, using pure refrigerant and/or a refrigerant/oil mixture as lubricant, leads to ultra-thin lubrications film thickness (UTFT) conditions due to the refrigerant providing an elasto-hydrodynamic lubrication film with a thickness of less than 200 nm. Since these applications work with very thin film thicknesses (e.g. less than 200 nm) any solid particle (debris, sand, oil soot, etc.) even the very small ones can produce damage in the contact surfaces and can modify the topography disrupting the film build-up capability of the original surface. Excessive contamination, which is also an issue in refrigerant lubricated rolling bearing, can also generate high friction forces that will hinder/block the rotation of the bearing and can produce fractures in the cage or seizure in the raceways and rolling elements.

Thus, in order to improve the wear and fatigue life of hybrid rolling bearings used in the refrigerant compressor, it has already been common knowledge to use a hardened high nitrogen stainless steel, e.g. VC444 steel, and silicon nitride rolling elements for the hybrid rolling bearing.

Additionally, the inventors have found that micropitting and corrosion induced wear of a hybrid rolling bearing may be significantly reduced if the roughnesses of at least one rolling element is significantly higher than the roughness of the remaining rolling elements. The higher $R_{q2,i}$ roughness value of the at least one rolling element allows for an increased wear when the at least one rolling element with the increase roughness contacts the raceways. Even if increased wear should in generally be avoided, the intended wear smoothes out indentations in the raceways which occur during the service life of the bearing. This in turn reduces the overall corrosion of the hybrid bearing and prolongs the service life of the bearing.

A further advantage of the at least one rolling element with the increased roughness is that contamination particles may be received within the rough surface of the at least one rolling element. Thereby, contamination particles, which are known to damage the raceways of the rings and/or rolling elements, may be filtered out, which also increases the wear and corrosion resistance of the bearing.

Thereby, it has been proven as advantageous, if the increased RMS roughness $R_{q2,N}$ of the at least one rolling element is 10 to 25 times higher than the RMS roughnesses $R_{q2,i}$ of the remaining rolling elements. Such a high roughness allows for excellent smoothing results.

The smoothing results are shown in FIG. 2. FIG. 2 shows comparing micro-photographs of raceways of a conventional hybrid rolling bearing (FIGS. 2A and 2C) and of the raceways of a hybrid rolling bearing according to the present invention (FIGS. 2B and 2D) before (FIGS. 2A and 2B) and after a 24 h run (FIGS. 2B, and 2D).

Figure 2A:
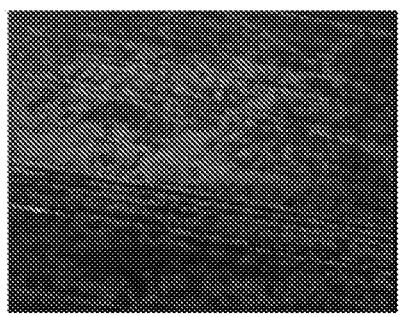
FIG. 2A presents micro-photographs of a raceway of a conventional hybrid rolling bearing before a 24 hour run.
Figure 2B:
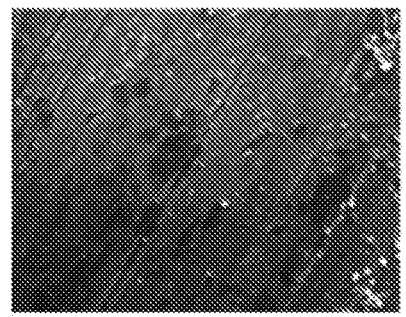
FIG. 2B presents micro-photographs of a raceway of a hybrid rolling bearing according to the present invention before a 24 hour run.
Figure 2C:
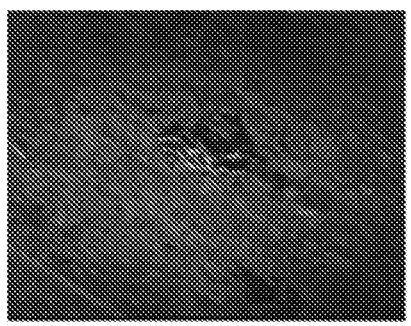
FIG. 2C presents micro-photographs of a raceway of a conventional hybrid rolling bearing after a 24 hour run.
Figure 2D:
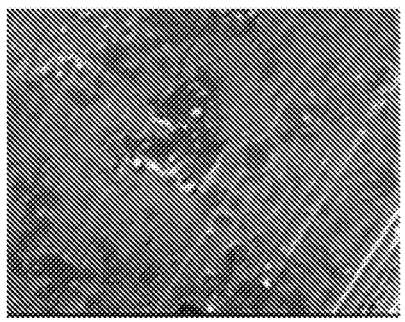
FIG. 2D presents micro-photographs of a raceway of a hybrid rolling bearing according to the present invention after a 24 hour run.

Comparing FIGS. 2A and 2B one can observe that the raceway of the hybrid bearing according to the present invention clearly shows visible honing marks on the raceway while they have almost disappeared on the raceway of the conventional hybrid bearing. FIGS. 2C and 2D show small hard particle indentations found in all bearings, however FIG. 2D, depicting the raceway of the hybrid bearing according to the invention, shows a smoother appearance of the indentation. Further, the surface of the raceway of the hybrid bearing according to the invention shows less wear on the honing marks than the corresponding raceway of the conventional hybrid bearing. This is due to the fact that the increased roughness of the at least one rolling element smoothes out the indentations and also reduces the corrosion at the honing marks.

Further, the contacting surfaces of the hybrid bearing in mint conditions are engineered to be within predefined boundaries. It has been therefore proposed by the inventors to provide a hybrid ball baring 20, wherein the outer raceway 25 and the inner raceway 23 are made from bearing steel and have a first surface RMS roughness $R_{q1}$, and wherein at least one ball 26 is made from a ceramic material and has a second surface RMS roughness $R_{q2}$. Further it has been suggested that in mint conditions the roughness of the raceways $R_{q1}$ is 2 to 5 times higher than the roughness $R_{q2}$ of the at least one ball 26 and/or the increased RMS roughness $R_{q2,N}$ of the at least one ball is 2 to 12 times higher than the RMS roughness of the raceways $R_{q1}$ Additionally or alternatively, the roughnesses of the hybrid roller bearing are engineered. Consequently, the outer raceway 15 and the inner raceway 13 of the hybrid roller bearings 10 are made from bearing steel and have a first surface RMS roughness $R_{q1}$, and wherein at least one roller 16 is made from a ceramic material and has a second surface RMS roughness $R_{q2}$. Further it has been suggested that in mint conditions the roughness of the raceways $R_{q1}$ is 1.2 to 4 times higher than the roughness $R_{q2}$ of the at least one roller 16. Consequently, for the hybrid roller bearing the increased RMS roughness $R_{q2,N}$ of the at least one roller is 1.2 to 10 times higher than the RMS roughness of the raceways $R_{q1}$.

These predetermined roughnesses allow for avoiding any solid-to-solid contact even at mint conditions and under ultra-thin lubrications film thickness operating conditions of the hybrid ball bearing.

The steel used for the rings and the raceway is preferably a hardened corrosion resistant steel, e.g. VC444 steel, another example is DIN X30CrMoN15-1 (AMS 5898). In general the hardened corrosion-resistant bearing steel for UTFT conditions refers to a bearing steel with an after-heat-treatment hardness≥HRC 58 and/or fracture toughness of at least 14 MPa m½ (ASTM—E399-12). It is further preferred, if the corrosion resistance has a pitting potential bigger or equal to +25 mV higher than the stainless steel reference (AISI 440C) according to ASTM G61-86. After heat treatments the ring raceways 13, 15, 23, 25 are machined to dimensions, and the desired roughness is adjusted. The heat treatment usually comprises one of more of the following steps:
 a. Austenitising at 1000° C. to 1150° C.;
 b. Gas quench;
 c. Subzero treatment at −40° C. to −150° C.;
 d. Tempering to certain temperatures for different dimensional stability properties.

Table 1 shows one example of the covered steel: DIN X30CrMoN15-1 (AMS 5898), compared with the reference steel AISI 440 C. It is further shown that different tempering temperatures give different dimensional stability properties for the same corrosion resistant steel.

TABLE 1

Example of corrosion resistant steel parameters

| Steel | Pitting Potential relative to reference, [mV] | Tempering | Hardness |
|---|---|---|---|
| DIN X30CrMoN15-1 | +25 | At 4000 C. to 550° C. | ≥58 HRC |
| DIN X30CrMoN15-1 | +375 | At 1500 C. to 240° C. | ≥58 HRC |
| AISI 440C | 0 | Min. of ~204° C. | ≥58 HRC |

The rolling elements, namely the rollers 16 and the balls 26 of the hybrid rolling bearings 10, 20, are Silicon Nitride Balls (Si3N4): The rolling elements 16, 26 are made by most stringent ceramic quality control and grade and have to pass ASTM F2094 or ISO 26602 class I and II with rolling element grade equal or better than G10.

Besides the roughness difference as mentioned above, the inventors have further found that it is preferred to adjust the combined roughness of raceways and rolling elements of the hybrid rolling bearings 10, 20 used for applications operating under UTFT conditions to predetermined ranges. It has been proven that hybrid rolling bearings 10, 20 having the roughness values as listed below are particularly resistant to corrosion induced wear even in UTFT conditions:

For the hybrid ball bearings 20, the following values apply:
 the combined surface RMS roughness $R_q$ of raceways and the remaining balls is $R_q < 4 \times 10^{-9}(1000 d_m)^{0.55}$ [meter], and the combined surface RMS roughness $R_q$ of raceways and the at least one ball with the increased roughness is $R_q \leq f^* 4 \times 10^{-9}(1000 d_4)^{0.55}$ [meter], with $2 \leq f \leq 12$, wherein $R_q$ is defined as $R_q = \sqrt{R_{q1}^2 + R_{q2}^2}$;
 the combined roughness skewness $R_{sk}$ of raceways and all balls is $R_{sk} \leq 0$, wherein $R_{sk}$ is defined as $$R_{sk} = \frac{R_{sk1} R_{q1}^3 + R_{sk2} R_{q2}^3}{R_q^3};$$

the combined roughness slope parameter $R_{\Delta qx}$ of raceways and remaining balls is $R_{\Delta qx} \leq 8$ [mrad], and the combined roughness slope parameter $R_{\Delta qx}$ of raceways and the at least one ball with increased roughness is $R_{\Delta qx} \leq f^* 8$ [mrad], with $2 \leq f \leq 12$, wherein $R_{\Delta qx}$ is defined as $$R_{\Delta qx} = \frac{R_{\Delta qx1} + R_{\Delta qx2}}{2}.$$

For the hybrid roller bearings 10, the following values apply:

the combined surface RMS roughness $R_q$ of raceways and the remaining rollers is $R_q \leq 5 \times 10^{-8}(1000d_m)^{0.2}$ [meter], and the combined surface RMS roughness $R_q$ of raceways and the at least one roller with the increased roughness is $R_q \leq f*5 \times 10^{-8}(1000d_m)^{0.2}$ [meter], with $1.2 \leq f \leq 18$, wherein $R_q$ is defined as $R_q = \sqrt{R_{q1}^2 + R_{q2}^2}$;

the combined roughness skewness $R_{sk}$ of raceways and all rollers is $R_{sk} \leq 0$, wherein $R_{sk}$ is defined as $$R_{sk} = \frac{R_{sk1}R_{q1}^3 + R_{sk2}R_{q2}^3}{R_q^3};$$

the combined roughness slope parameter $R_{\Delta qx}$ of raceways and remaining rollers is $R_{\Delta qx} \leq 50$ [mrad], and the combined roughness slope parameter $R_{\Delta qx}$ of raceways and the at least one roller with increased roughness is $R_{\Delta qx} \leq f*50$ [mrad], with $1.2 \leq f \leq 18$, wherein $R_{\Delta qx}$ is defined as $$R_{\Delta qx} = \frac{R_{\Delta qx1} + R_{\Delta qx2}}{2}.$$

By providing at least one hybrid rolling bearing 10; 20 being engineered to have the above defined parameters, the ceramic balls and/or rollers reduce boundary frictions and optimize running-in. Further in poor lubrication and contamination conditions, the proposed ceramic balls/rollers delay the damage progression. In addition, the tight control of the composed roughness helps in the build-up of lubrication films and the improvement of running-in. The roughness of the raceways may be adapted by using appropriate honing and grinding processes. The roughness of the ceramic rolling elements may be adapted by using appropriate grinding and lapping processes using diamond abrasives.

REFERENCE ELEMENT DESCRIPTIONS

| Ref. No. | Description |
|---|---|
| 1 | refrigerant compressor |
| 2 | electric motor |
| 4 | compressor shaft |
| 10 | hybrid roller bearing |
| 12 | inner ring of the hybrid roller bearing |
| 13 | raceway of the inner ring of the hybrid roller bearing |
| 14 | outer ring of the hybrid roller bearing |
| 15 | raceway of the outer ring of the hybrid roller bearing |
| 16 | roller of the hybrid roller bearing |
| 17 | raceway of the roller of the hybrid roller bearing |
| 18 | cage of the hybrid roller bearing |
| 20 | hybrid ball bearing |
| 22 | inner ring of the hybrid ball bearing |
| 23 | raceway of the inner ring of the hybrid ball bearing |
| 24 | outer ring of the hybrid ball bearing |
| 25 | raceway of the outer ring of the hybrid ball bearing |
| 26 | balls of the hybrid ball bearing |
| 27 | surface of the balls of the hybrid ball bearing |
| 28 | cage of the hybrid ball bearing |
| 30, 32 | lubrications means |

What is claimed is:

1. A hybrid rolling bearing comprising:
an inner raceway;
an outer raceway; and
a plurality of rolling elements arranged therebetween,
wherein the outer raceway and the inner raceway are made from bearing steel and have a first surface RMS roughness $R_{q1}$, and the rolling elements are made from a ceramic material,
wherein the plurality of rolling elements include at least one of the rolling elements having an increased surface RMS roughness $R_{q2,N}$ which is at least ten (10) times higher than a RMS roughnesses $R_{q2,i}$ of any remaining rolling elements, wherein the remaining rolling elements include at least one of the rolling elements.

2. The hybrid rolling bearing according to claim 1, wherein the increased RMS roughness $R_{q2,N}$ of the at least one rolling element is twenty-five (25) times higher than the RMS roughnesses $R_{q2,i}$ of the remaining rolling elements.

3. The hybrid rolling bearing according to claim 1, wherein the increased roughness $R_{q2,N}$ of the at least one rolling element is higher than the roughness $R_{q1}$ of the raceways.

4. The hybrid rolling bearing according to claim 1, wherein the hybrid rolling bearing is a hybrid ball bearing (20) and the rolling elements are balls.

5. The hybrid rolling bearing according to claim 4, wherein the increased RMS roughness $R_{q2,N}$ of the at least one ball is 2 to 12 times higher than the RMS roughness of the raceways $R_{q1}$.

6. The hybrid rolling bearing according to claim 4, wherein at least one of:
the combined surface RMS roughness $R_q$ of raceways and the remaining balls is $R_q \leq 4 \times 10^{-9}(1000d_m)^{0.55}$ [meter], and the combined surface RMS roughness $R_q$ of raceways and the at least one ball with the increased roughness is $R_q \leq f*4 \times 10^{-9}(1000d_m)^{0.55}$ [meter], with $2 \leq f \leq 12$, wherein $R_q$ is defined as $R_q = \sqrt{R_{q1}^2 + R_{q2}^2}$, wherein $d_m$ is a mean diameter of the hybrid rolling bearing and $R_{q2}$ is the roughness of remaining balls,
the combined roughness skewness $R_{sk}$ of raceways and all balls is $R_{sk} \leq 0$, wherein $R_{sk}$ is defined as $$R_{sk} = \frac{R_{sk1}R_{q1}^3 + R_{sk2}R_{q2}^3}{R_q^3};$$

wherein $R_{sk1}$ is a combined roughness skewness of raceways and $R_{sk2}$ is a combined roughness skewness of balls, and
the combined roughness slope parameter $R_{\Delta qx}$ of raceways and remaining balls is $R_{\Delta qx} \leq 8$ [mrad], and the combined roughness slope parameter $R_{\Delta qx}$ of raceways and the at least one ball with increased roughness is $R_{\Delta qx} \leq f*8$ [mrad], with $2 \leq f \leq 12$, wherein $R_{\Delta qx}$ is defined as $$R_{\Delta qx} = \frac{R_{\Delta qx1} + R_{\Delta qx2}}{2},$$

wherein $R_{\Delta qx1}$ is a combined roughness slope parameter of raceways and $R_{\Delta qx2}$ is a combined roughness slope parameter of remaining balls.

7. The hybrid rolling bearing according to claim 1, wherein the rolling elements are rollers.

8. The hybrid rolling bearing according to claim 7, wherein the increased RMS roughness $R_{q2,N}$ of the at least one roller is two (2) to twelve (12) times higher than the RMS roughness of the raceways $R_{q1}$.

9. The hybrid rolling bearing according to claim 7, wherein at least one of:

the combined surface RMS roughness $R_q$ of raceways and the remaining rollers is $R_q \leq 5 \times 10^{-8} (1000 d_m)^{0.2}$ [meter], and the combined surface RMS roughness $R_q$ of raceways (13; 15) and the at least one roller with the increased roughness is $R_q \leq f*5 \times 10^{-8}(1000 d_m)^{0.2}$ [meter], with $1.2 \leq f \leq 18$, wherein $R_q$ is defined as $R_q = \sqrt{R_{q1}^2 + R_{q2}^2}$, wherein $d_m$ is a mean diameter of the hybrid rolling bearing, the combined roughness skewness $R_{sk}$ of raceways (13; 15) and all rollers is $R_{sk} \leq 0$, wherein $R_{sk}$ is defined as $$R_{sk} = \frac{R_{sk1} R_{q1}^3 + R_{sk2} R_{q2}^3}{R_q^3},$$

wherein $R_{sk1}$ is a combined roughness skewness of raceways and $R_{sk2}$ is a combined roughness skewness of balls, and the combined roughness slope parameter $R_{\Delta qx}$ of raceways (13; 15) and remaining rollers is $R_{\Delta gx} \leq 50$ [mrad], and the combined roughness slope parameter $R_{\Delta gx}$ of raceways and the at least one roller with increased roughness is $R_{\Delta qx} \leq f *50$ [mrad], with $1.2 \leq f \leq 18$, wherein $Rd_{\Delta qx}$ is defined as $$R_{\Delta qx} = \frac{R_{\Delta qx1} + R_{\Delta qx2}}{2},$$

wherein $R_{\Delta qx1}$ is a combined roughness slope parameter of raceways and $R_{\Delta qx2}$ is a combined roughness slope parameter of remaining balls.

10. The hybrid rolling bearing according to claim 1, wherein an osculation $\Phi$ ranges between 1.02 and 1.1, wherein $\Phi$ is defined as $$\Phi = \frac{2r_{i,e}}{D_w},$$

with $r_{i,e}$ being the raceway radius of the inner raceway or the outer raceway, and $D_w$ being the diameter of the rolling elements.

11. The hybrid rolling bearing according to claim 1, wherein at least one raceway is made from a hardened corrosion-resistant steel, having a corrosion resistance with a pitting potential of at least 25 mV higher than the stainless steel reference (AISI 440C) according to ASTM G61-86.

12. The hybrid rolling bearing according to claim 1, wherein at least one rolling element is made from silicon nitride ($Si_3N_4$).

13. The hybrid rolling bearing according to claim 1, wherein the rolling elements are guided by means of a cage, which is preferably made from a fiber-enforced material, preferably from a glass-fiber enforced PEEK or a carbon fiber material.

14. The hybrid rolling bearing according to claim 1, wherein the hybrid rolling bearing is lubricated by an ultra-thin lubrication film arranged between the rolling elements and the raceways, wherein the lubrication film thickness is less than 300 nm.

15. The hybrid rolling bearing according claim 14, wherein the hybrid rolling bearing is lubricated with pure refrigerant or a refrigerant/oil mixture forming an elastohydrodynamic lubricant film between the rolling elements and the raceways.

16. The hybrid rolling bearing according claim 1, wherein the hybrid rolling bearing is installed in a refrigerant compressor.

* * * * *